METHOD AND AN ELECTRICAL SIGNAL COMPARATOR SYSTEM TO DETECT A DIFFERENCE BETWEEN ENCODED SIGNAL INFORMATION ON A PAIR OF DIFFERENT ELECTRICAL SIGNALS

Filed Aug. 7, 1967 4 Sheets-Sheet 1

INVENTOR.
JOHN C. STROLE
BY Herbert L. Davis
ATTORNEY

METHOD AND AN ELECTRICAL SIGNAL COMPARATOR SYSTEM TO DETECT A DIFFERENCE BETWEEN ENCODED SIGNAL INFORMATION ON A PAIR OF DIFFERENT ELECTRICAL SIGNALS

Filed Aug. 7, 1967 4 Sheets-Sheet 2

INVENTOR.
JOHN C. STROLE
BY Herbert L. Davis
ATTORNEY

METHOD AND AN ELECTRICAL SIGNAL COMPARATOR SYSTEM TO DETECT A DIFFERENCE BETWEEN ENCODED SIGNAL INFORMATION ON A PAIR OF DIFFERENT ELECTRICAL SIGNALS

Filed Aug. 7, 1967 4 Sheets-Sheet 3

INVENTOR.
JOHN C. STROLE
BY
Herbert L. Davis
ATTORNEY

METHOD AND AN ELECTRICAL SIGNAL COMPARATOR SYSTEM TO DETECT A DIFFERENCE BETWEEN ENCODED SIGNAL INFORMATION ON A PAIR OF DIFFERENT ELECTRICAL SIGNALS

Filed Aug. 7, 1967 4 Sheets-Sheet 4

INVENTOR.
JOHN C. STROLE
BY Herbert L. Davis
ATTORNEY

United States Patent Office 3,539,930

Patented Nov. 10, 1970

3,539,930

METHOD AND AN ELECTRICAL SIGNAL COMPARATOR SYSTEM TO DETECT A DIFFERENCE BETWEEN ENCODED SIGNAL INFORMATION ON A PAIR OF DIFFERENT ELECTRICAL SIGNALS

John C. Strole, Dumont, N.J., assignor to The Bendix Corporation, a corporation of Delaware Filed Aug. 7, 1967, Ser. No. 658,898
Int. Cl. H03k 5/20
U.S. Cl. 328—119 14 Claims

ABSTRACT OF THE DISCLOSURE

A method and signal comparator system in which the amplitudes of X and Y components from an electrical signal device, such as a resolver synchro or potentiometer, excited by one source and the amplitudes of the X and Y components of a second electrical signal device, such as a resolver, synchro or potentiometer, excited by a different source have the X component of each multiplied by the Y component of the other. The resulting signals are then applied to a suitable summing device such as a difference amplifier which produces a signal upon a difference in the signal information encoded on the compared electrical signals.

BACKGROUND OF THE INVENTION

Field of the invention

The invention is in the field of electrical analog signals as used in various control and indication systems. It is particularly directed to means for comparing such electrical signals to detect a difference, if any, between the information encoded on the signals.

Described of the prior art

With independent alternating current excitation sources which are phase locked, comparisons have been made using a Scott-Tee transformation to two-phase (resolver type) signal form, followed by an R-C network to produce a signal which is phase displaced from excitation by an angle proportional to the shaft angle. The two inputs could then be compared on a time basis.

Where both amplitude and phase/frequency are unsynchronized, comparison becomes more difficult. The present invention permits accurate comparison between two alternating current signals provided by a pair of alternating current signal devices excited by different independently varying excitations. When applied to synchro or resolver type signals, it produces a difference signal which represents the sine of the difference of the angles being transmitted. This is the intelligence desired, not the voltage of the signals which is not the true intelligence being transmitted.

SUMMARY OF THE INVENTION

There is provided a method and means to detect equality of a transmitted angle between two electrical signals, as for example alternating current signals, from a synchro or resolver system where the comparison independent of relative voltage, frequency or phase between the two source excitations. Detection of the equality of the transmitted angle may be performed between any signals where amplitudes, either alternating current or direct current, are available of the form sine $\theta$ and sine $(\theta-\phi)$, such for example as from sine/cosine output devices or such as are available of the form KV and V as from a pair of simple potentiometers. Further, it is applicable to analog multiplication and substraction using pulse area techniques with one input inverted so that a summing integrator may be utilized.

BRIEF DESCRIPTION OF THE DRAWINGS

Referring to the drawings in which corresponding parts have been indicated by corresponding numerals.

DESCRIPTION OF THE INVENTION

Figure 1:
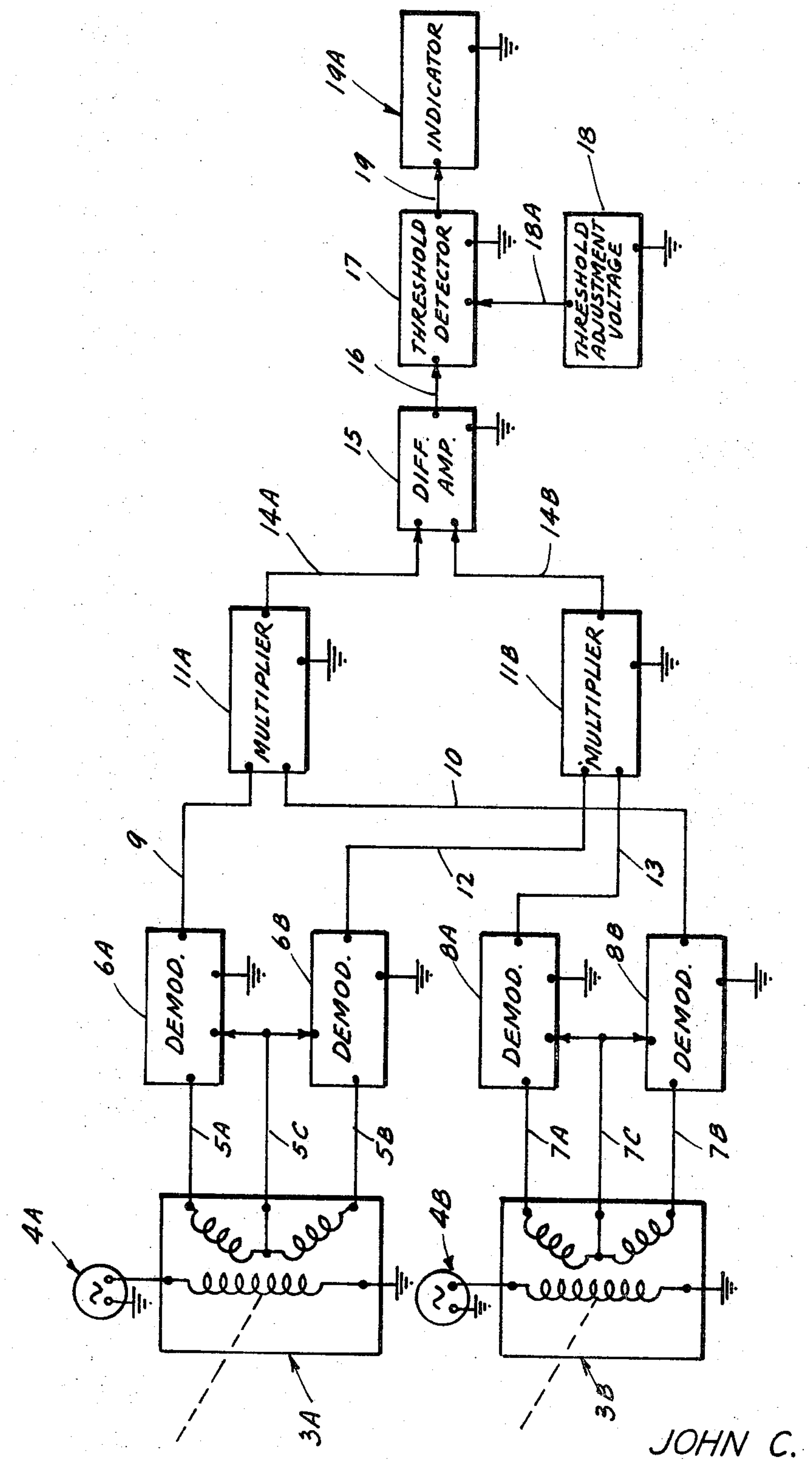
FIG. 1 is a schematic block diagram illustrating the invention as applied to a comparator system to detect a difference in encoded information on a pair of alternating current signals supplied from eletcrical signal devices of a three wire output type.

Referring now to FIG. 1, there is shown a suitable alternating current signal device, such as a synchro or a resolver indicated generally by numeral 3A and having a three wire signal output. The signal device 3A may be of a conventional type having a rotor winding excited from a suitable source of alternating current 4A. The rotor winding of the signal device 3A may be angularly positioned by suitable means in inductive relation to stator windings of the signal device 3A to apply encoded information on alternating current signals inducted in the stator windings of the signal device 3A. An output line 5A leading from the stator windings of the signal device 3A is connected to an input of a demodulator 6A. Another output line 5B leading from the stator windings of the signal device 3A is connected to an input of a second demodulator 6B. Further, an intermediate output line 5C leads from the stator windings of the signal device 3A and is connected to other inputs of both the demodulators 6A and 6B.

In a like manner, there is provided a separate alternating current signal from a different alternating current signal device such as a synchro or resolver indicated generally by numeral 3B and having a three wire signal output. The signal device 3B is also of a conventional type having a rotor winding excited by a different source of alternating current 4B. The rotor winding of the signal device 3B may also be angularly positioned by suitable means in inductive relation to stator windings of the signal device 3A to apply encoded information on alternating current signals induced in the stator windings of the signal device 3B. An output line 7A leading from the stator windings of the signal device 3B is connected to an input of a third demodulator 8A. Another output line 7B leading from the stator windings of the signal device 3B is connected to the input of a demodulator 8B. Also an intermediate output line 7C leads from the stator windings of the signal device 3B to other inputs of both the demodulators 8A and 8B.

The demodulators 6A, 6B, 8A and 8B have suitable grounded output conductors and further output terminals of the demodulators 6A and 8B are connected by conductors 9 and 10 respectively to separate inputs of a multiplier 11A having a suitable grounded input-output connection. Other output terminals of the demodulators 6B and 8A are connected by conductors 12 and 13, respectively, to separate inputs of a multiplier 11B also having a suitable grounded input-output connection.

An electrical output from the multiplier 11A proportional to the product of the multiplication of the electrical outputs from the demodulators 6A and 8B is connected by an output conductor 14A to an input of a difference amplifier 15 also having a suitable grounded input-output connection. Also an electrical output from the multiplier 11B proportional to the product of the multiplication of the electrical outputs from the demodulators 6B and 8A is connected by an output conductor 14B to a separate input of the difference amplifier 15.

An electrical output from the difference amplifier 15 proportional to any difference between the product of the outputs of the demodulators 6A and 8B and the product of the outputs of the demodulators 6B and 8A is applied by an output conductor 16 to an input of a threshold detector 17 having a suitable grounded input-output connection. The detector 17 may be referenced to a fixed threshold level by a suitable adjustable threshold voltage device 18 operatively connected to the detector 17 by an electrical output conductor 18A and a grounded output connection, or threshold voltage may be provided for the detector 17 which is a function of the excitation voltages, such as their (attenuated) sum. An electrical output difference or GO/NO-GO signal is applied through an output conductor 19 leading from an output of the threshold detector 17 to a suitable indicator 19A having a grounded input connection.

THREE WIRE OUTPUT ALTERNATING CURRENT SIGNAL DEVICE—FIG. 2

Figure 2:
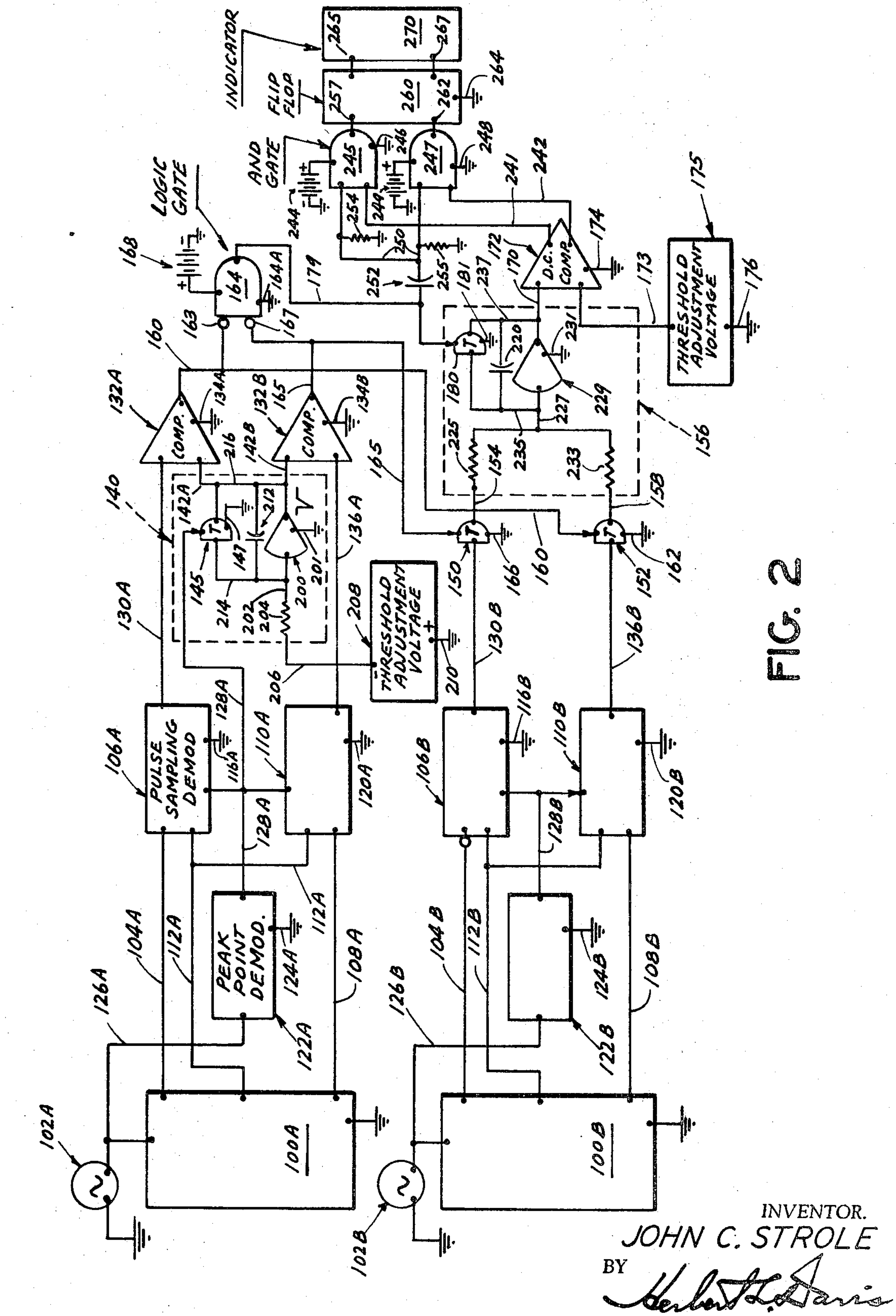
FIG. 2 is a schematic detail wiring diagram of a comparator system embodying a modified form of the invention of FIG. 1.

Referring now to the modified form of the invention of FIG. 2, there is shown a suitable alternating current signal device, such as a synchro or a resolver indicated generally by the numeral 100A and having a three wire output. The signal device 100A is of a conventional type excited from a suitable source of alternating current 102A.

One output lead 104A from the alternating current signal device 100A is connected to an input of a pulse sampling demodulator 106A. Another output lead 108A from the signal device 100A is connected to an input of another pulse sampling demodulator 110A. A third output lead 112A from the signal device 100A is connected to other inputs of both demodulators 106A and 110A. Each of the demodulators 106A and 110A have a suitable grounded input-output connection 116A and 120A, respectively.

The demodulators 106A and 110A are synchronized to the alternating current excitation source 102A by a peak point detector 122A of conventional type having a grounded input-output connection 124A and an input connected through a conductor 126A to the source of alternating current 102A and an output connected through a conductor 128A to other inputs of the demodulators 106A and 110A to effect synchronization in the operation of the demodulators 106A and 110A in relation to the alternating current supply from the source of alternating current 102A.

The output of the demodulator 106A is connected by a conductor 130A to one input of a comparator 132A of a conventional type having a grounded input-output connection 134A, while the demodulator 110A has an output connected by a conductor 136A to one input of a comparator 132B of a conventional type also having a grounded input-output connection 134B. Other inputs of the comparators 132A and 132B are fed in parallel by outputs of a ramp generator 140, as hereinafter explained.

The outputs from the ramp generator 140 are applied through output conductors 142A and 142B leading to the other inputs of the comparators 132A and 132B, respectively. Controlling operation of the ramp generator 140 is a transmission gate 145 having a control terminal connected to the output conductor 128A leading from the peak point detector 122A and also to the inputs of the demodulators 106A and 110A. The transmission gate 145 also has a grounded control terminal 147. A direct current pulse output from the peak point demodulator 122A acts to periodically close the transmission gate 145 so as to effect the operation of the ramp generator 140 in a synchronized relation to the demodulators 106A and 110A and the source of alternating current 102A, as will be explained hereinafter.

In like manner, there is provided a separate signal from a different source of an alternating current signal such as a synchro or a resolver indicated generally by the numeral 100B and having a three wire output. The signal source 100B is also of a conventional type excited by a different source of alternating current 102B.

The separate signal source 100B has an output lead 104B connected to an input of a pulse sampling demodulator 106B in such a manner as to invert the output signal applied through the lead 104B to the input of the demodulator 106B. Another output lead 108B from the separate signal source 100B is connected to an input of a pulse sampling demodulator 110B and a third output lead 112B from the signal source 100B is connected to inputs of both the demodulators 106B and 110B. The demodulators 106B and 110B have grounded input-output terminals 116B and 120B, respectively.

Also, the demodulators 106B and 110B are synchronized to the separate alternating current excitation source 102B by a peak point detector 122B of conventional type having an input connected through a conductor 126B to the source of alternating current 102B and an output connected through a conductor 128B to inputs of the demodulators 106B and 110B to effect synchronization in the operation of the demodulators 106B and 110B in relation to the source of alternating current 102B. The peak point detector 122B has a grounded input-output terminal 124B.

Further, the alternating current signal applied through the output conductor 104B from the signal source 100B to the input of the demodulator 106B is applied in an inverted form for purposes to be hereinafter explained with reference to the operation of the form of the invention of FIG. 2.

An output from the demodulator 106B is connected by a conductor 130B to an input of a transmission gate 150 while the output from the demodulator 110B is connected by a conductor 136B to an input of a transmission gate 152. An output from the gate 150 is connected by a conductor 154 to an input of an integrator 156 while the output from the gate 152 is connected by a conductor 158 to another input of the integrator 156. An output from the comparator 132A is connected by a conductor 160 to a control terminal of the transmission gate 152 having a grounded control terminal 162. The output signal applied to conductor 160 is inverted by conventional means at 163 and applied to an input to a logic gate 164. The output of the comparator 132B is connected by a conductor 165 to a control terminal of the transmission gate 150 having a grounded control terminal 166. The output signal applied to conductor 165 is inverted by conventional means at 167 and applied to a second input of the logic gate 164. The logic gate 164 has a grounded input-output terminal 164A.

The comparator 132A provides a positive going "high" signal to the output conductor 160 upon the electrical output of the demodulator 106A applied at conductor 130A exceeding the value of the electrical output of the ramp generator 140 applied at the output conductor 142A and a negative going "low" signal upon the electrical output of the ramp generator 140 applied at the output conductor 142A exceeding the value of the electrical output of the demodulator 106A applied at conductor 130A.

Similarly, the comparator 132B provides a positive going "high" signal to the output conductor 165 upon the electrical output of the demodulator 110A applied at conductor 136A exceeding the value of the electrical output of the ramp generator 140 applied at the output conductor 142B and a negative going "low" signal upon the electrical output of the ramp generator 140 applied at the output conductor 142B exceeding the value of the electrical output of the demodulator 110A applied at conductor 136A.

The logic gate 164 is of a conventional type arranged to control application of a source of electrical energy or battery 168 having a positive terminal connected to the logic gate 164 and a negative terminal connected to ground. The logic gate 164 is arranged to connect the positive terminal of the battery 168 to an output conductor 179 to provide a "high" signal output only upon both of the outputs applied through the output conductors 160 and 165 by the comparators 132A and 132B being "low" and thus indicative that outputs from both demodulator 106A and 110B are below the critical level set by the ramp generator 140.

Upon either or both of the inputs of the logic gate 164 being "high," the logic gate 164 effectively opens the circuit from the battery 168 and there is then applied a "low" signal to the output conductor 179. The "high" or "low" output signal, thus selectively applied through the logic gate 164 is connected by the conductor 179 to a control terminal of a transmission gate or reset device 180 of conventional type having a grounded control terminal 181 and so arranged that upon the "high" output signal being received from the logic gate 164 the transmission gate 180 closes a control circuit to reset the integrator 156, as hereinafter explained.

The output of the integrator 156 is connected by a conductor 170 to an input terminal of a direct current window comparator 172 having a grounded input-output terminal 174. A source of an adjustable threshold D.C. voltage 175 having a grounded output terminal 176 is also connected by a conductor 173 to another input terminal of the comparator 172. The comparator 172 is of a conventional type effective to detect levels greater than or less than the absolute value of a threshold voltage provided by the adjustable threshold voltage device 175.

Ramp generator 140

Referring now more particularly to the ramp generator 140, it will be seen that the same as shown in FIG. 2 includes a direct current operational amplifier 200 having an input connected through a conductor 202 to one terminal of a resistor element 204 having an opposite terminal connected through a conductor 206 to a negative terminal of a direct current threshold adjustment voltage device 208 which has a positive terminal thereof connected to a grounded conductor 210. The threshold voltage device 208 is adjusted so as to set the output voltage level at the output conductor 142A and 142B leading from the ramp generator 140 having a grounded input-output terminal 201.

An integrating capacitor 212 has one plate thereof connected to a conductor 214 which leads from the input conductor 202 of the operational amplifier 200 to an input terminal of the transmission gate 145 having an output terminal connected through a conductor 216 to the opposite plate of the integrating capacitor 212. The conductor 216 leads from the output conductor 142B of the ramp generator 140 and thereby from the output of the operational amplifier 200 to the output terminal of the transmission gate 145 and to the other output conductor 142A of the ramp generator 140. The integrating capacitor 212 together with the resistor 204 forms the time constant of an integrator network 200–212 including the resistor 204, capacitor 212 and D.C. operational amplifier 200 in the ramp generator 140.

The transmission gate 145 is periodically closed by an output pulse applied to the output conductor 128A by the peak point demodulator 122A so as to establish initial conditions for operation of the integrator network 200–212.

The output from the integrator network 200–212 of the ramp generator 140 is applied through the output conductor 142A to one terminal of the comparator 132A and through the other output conductor 142B to one terminal of the other comparator 132B. The opposite input terminal of the comparator 132A is connected through conductor 130A to output pulses applied by the pulse sampling demodulator 106A, while an opposite input terminal of the other comparator 132B is connected through an output conductor 136A to output pulses applied by the pulse sampling demodulator 110A.

The difference between the respective signals applied at the input terminals of the comparator 132A is applied through the output conductor 160 and through the inverting means 163 to the input terminal of the logic gate 164 while the difference between the respective signals applied at the input terminals of the other comparator 132B is applied through the output conductor 165 and through the inverting means 167 to the other input terminal of the logic gate 164. The output line 160 of the comparator 132A is also connected to a control terminal of the transmission gate 152 while the output conductor 165 leading from the output of the comparator 132B is also connected to the control terminal of another transmission gate 150.

The transmission gate 150 is normally open and is arranged to close a connection between the output conductor 130B of the demodulator 106B and the input conductor 154 leading to the input of the integrator 156 upon a "high" electrical signal being applied to the conductor 165 leading from the comparator 132B to the control terminal of the transmission gate 150. Similarly, the transmission gate 152 is normally open and is arranged to close the connection between the output conductor 136B of the demodulator 110B and the conductor 158 leading to the input of the integrator 156 upon a "high" electrical signal being applied to the output conductor 160 leading from the other comparator 132A to the control terminal of the transmission gate 152.

The output of the logic gate 164 controlled by the inverted outputs from the comparators 132A and 132B is connected through an output conductor 179 to a control terminal of a transmission gate 180 so arranged so as to effect a reset of the integrator 156 to establish initial conditions for the operation thereof.

The logic gate 164 is of the type which provides an output which is "high" only when neither the output from the comparator 132A nor the output from the comparator 132B are "high."

Thus, if the output from either the comparator 132A or the comparator 132B is in a "high" condition, the output from the logic gate 164 applied through conductor 179 will be "low." However, when both the output from the comparator 132A and the output from comparator 132B are "low" indicative that both the output from the demodulator 106A and the demodulator 110A are less than the output voltage from the ramp generator 140, then the output from the logic gate 164 applied through the output conductor 179 will be "high." This "high" signal applied through the output conductor 179 will cause the transmission gate 180 to close or become conductive so as to short and thereby reset an integrating capacitor 220 controlled thereby while at the same time the transmission gates 150 and 152 open the circuits from the outputs of the demodulators 106B and 110B to the inputs of the integrator network 156.

Integrator network 156

The integrator network 156, as shown in FIG. 2, has a first input connected through an input conductor 154 and the transmission gate 150 to an output conductor 130B leading from the pulse sampling network 106B upon the control conductor 165 having a "high" electrical control signal applied thereto by the differential comparator 132B. However, upon the "high" electrical control signal being removed the transmission gate 150 opens the connection between the conductor 130B and the input conductor 154 of the integrator network 156.

The integrator network 156 has a second input conductor 158 electrically connected through the transmission gate 152 to the output conductor 136B leading from the pulse sampling demodulator 110B upon the controlling electrical signal applied through the output conductor 160 from the comparator 132A being in a "high" condition. However, upon the "high electrical control signal applied at the conductor 160 being removed, the transmission gate 152 opens the electrical connection between the conductor 136B and the input conductor 158 leading to the second input of the integrator network 156.

Thus, upon the controlling signal applied at the conductor 165 being in a "high" condition, the signal applied at the output conductor 130B is connected through the transmission gate 150, and the input conductor 154 to a resistor 225 and therethrough to a conductor 227 leading to an input of a direct current operational amplifier 229 having a grounded input-output conductor 231.

Similarly, upon a "high" controlling signal being applied to conductor 160, the output conductor 136B leading from the pulse sampling demodulator 110B is connected through the transmission gate 152 and the input conductor 158 to a resistor 233 and therethrough to the same input conductor 227 leading to the input of the direct current operational amplifier 229. The resistors 225 and 233 have equal resistance values.

An integrating capacitor 220 has one plate connected to a conductor 235 leading from the input conductor 227 to an input terminal of the controlling transmission gate 180, while an opposite plate of the integrating capacitor 220 is connected to a conductor 237 which is in turn connected to the conductor 170 leading from the output of the operational amplifier 229. The conductor 237 further leads to an output terminal of the transmission gate 180 so that the integrator capacitor 220 is effectively connected across the input and output of the direct current operational amplifier 229. The capacitor 220 with the effective resistor 225 or 233 forms the time constant for the integrator 156.

The capacitor 220 is shorted by closure of the transmission gate 180 to reset the integrator network upon the logic gate 164 applying a high signal through the output conductor 179 to the control terminal of the transmission gate 180.

The electrical signals applied through the output conductors 130B and 136B to the input conductors 154 and 158, respectively, of the integrator 156 are thus controlled by the operation of the transmission gates 150 and 152, respectively, in such a manner that the electrical signal applied to the input conductor 154 is of a width proportional to the amplitude of the signal appearing on the output conductor 136A leading from the output of the demodulator 110A and is of an amplitude proportional to the amplitude of the electrical signal on the electrical output conductor 130B leading from the output of the demodulator 106B, while the electrical signal at the input conductor 158 will be of a width proportional to the amplitude of the signal at the output conductor 130A leading from the output of the demodulator 106A and is of an amplitude proportional to the amplitude of the electrical signal appearing on the output conductor 136B leading from the output of the demodulator 110B.

The electrical signals appearing on the input lines 154 and 158 to the integrator 156 are then applied through the electrical resistance 225 and 233, respectively, to the integrator capacitor 220 and to the common input line 227 leading to the input of the direct current operational amplifier 229.

The output from the direct current operational amplifier 229, as applied at the output conductor 170, in effect represents the algebraic sum of the integrated areas of the electrical pulses appearing at the input conductors 154 and 158 at the instant that the signal at the output conductor 179 leading from the logic gate 164 becomes high and which, as heretofore explained, occurs only when the signals at the output conductors 160 and 165 leading from the respective comparators 132A and 132B are both "low" so as to in turn so control the transmission gates 150 and 152 as to render the same nonconductive and thereby define the widths of the electrical pulses at the input conductors 154 and 158 leading to the integrator network 156.

Because of the inversion applied to the signal at the input lead 104B leading from alternating current signal source 100B to the pulse sampling demodulator 106B, and since the output of the pulse sampling demodulator 106B is connected by conductor 130B to the input of transmission gate 150 and therethrough to the input conductor 154 of the integrator 156, the instantaneous algebraic sum signal appearing at the output conductor 170 of integrator 156 actually represents the algebraic difference between the amplitudes of the products of two sets of signals.

The product of one of the two sets of signals is formed by multiplying the peak amplitude of the signal appearing on conductor 104A as referenced to conductor 112A, both from signal source 100A, by the peak amplitude of the signal on conductor 108B as referenced to conductor 112B, both from signal source 100B, while the product of the other of said two sets of signals is similarly formed by multiplying the peak amplitude of the signal appearing on conductor 108A as referenced to conductor 112A, both from signal source 100A, by the peak amplitude of the signal on conductor 104B as referenced to conductor 112B, both from signal source 100B.

After the electrical signal at the output conductor 179 leading from the logic gate 164 becomes "high," the transmission gate 180 becomes conductive to discharge the integrating capacitor 220 and effects at the output conductor 170 of the integrator network 156 a reference zero signal which continues so long as the signal at the controlling conductor 179 remains "high" which is in turn dependent upon the signals at the conductors 160 and 165 leading from the comparators 132A and 132B, respectively, being "low." Upon one or both of the signals at the output conductors 160 and 165 going high the output from the logic gate 164 applied at the conductor 179 will be "low" whereupon the transmission gate 180 will be open so as to allow the integrating process to proceed.

The electrical output signal applied then by the integrator network 156 is connected through the output conductor 170 to one input terminal of a direct current window comparator 172 having another input terminal connected to an output conductor 173 leading from an output of a direct current threshold adjustment voltage device 175 having a grounded output terminal 176. The direct current window comparator 172 is of a conventional type having a grounded input-output terminal 174 and a first output conductor 241.

The comparator 172 is so arranged that at the output conductor 241 the output signal will be high when the absolute value of the electrical signal on the output conductors 170 is less than the absolute value of the threshold adjustment voltage applied through the conductor 173, while the electrical signal applied at the conductor 241 will be low when the converse is true. The window comparator 172 also has a second output conductor 242 at which the electrical signal will be low when the absolute value of the signal on the input conductor 170 is less than the absolute value of the threshold adjustment voltage applied through the conductor 173, while the electrical signal applied at the conductor 242 will be high when the converse is true.

Condition sampler

The electrical signal thus applied from the output conductor 241 is connected to an input terminal of an "AND" gate 245 of a conventional type controlling a source of electrical energy or battery 244 and having a grounded input-output terminal 246, while an electrical output signal applied through conductor 242 is connected to an input terminal of another "AND" gate 247 also of a conventional type controlling a source of electrical energy or battery 249 and having a grounded input-output terminal 248.

Further connected to other input control terminals of both the "AND" gates 245 and 247 is a conductor 250 leading to one plate of a coupling or differentiating capacitor 252. The opposite plate of the capacitor 252 is connected to the conductor 179 leading from the output of the logic gate 164. Thus, there is connected the differentiating capacitor 252 between the line 179 and input line 250 leading to the respective input control terminals of the "AND" gates 245 and 247.

The capacitor 252 together with input resistors 254 and 255 connected between ground and the lines 250 leading to the respective input control terminals of the "AND" gates 245 and 247 provides a differentiating network such that a high electrical sampling pulse signal is applied at the input conductors 250 only at the instant that the electrical signal at the output conductor 179 from the logic gates 164 goes high, while at all other times the electrical signal at the input conductors 250 is effectively zero.

The high electrical sampling pulse signal is applied through conductor 250 to one of the input control terminals of each of the "AND" gates 245 and 247 while another input terminal of the "AND" gate 245 is connected to the conductor 241 leading from an output terminal of the D.C. comparator 172 and another input terminal of the "AND" gate 247 is connected to the conductor 242 leading from the other output terminal of the D.C. comparator 172.

Further, an output conductor 257 leads from the output of the "AND" gate 245 to an input of a flip-flop network 260 while another output conductor 262 leads from an output of the "AND" gate 247 to another input of the flip-flop network 260. The flip-flop network 260 is of a conventional type and has an input-output grounded terminal 264. Further, output conductors 265 and 267 lead from the flip-flop network 260 to inputs of an indicator network 270 which may be of a conventional GO/NO-GO type.

The arrangement is such that the "AND" gates 245 and 247 are rendered effective in response to the sampling pulse applied by the differentiating capacitor 252 to the input control terminals through conductor 250 to transmit to the flip-flop network 260 the condition (high or low) existing at the lines 241 and 242 leading from the outputs of the window comparator 172 to the input terminals of the "AND" gates 245 and 247.

The flip-flop network 260 in response to these electrical signals applied at the output conductors 241 and 242 stores the sampled condition effective at the instant of the application of the sampling pulse through the action of the differentiating capacitor 252 on the input control terminals of the "AND" gates 245 and 247. Thus, the differentiating capacitor 252 connected between the reset control conductor 179 and the conductor 250 leading to the input control terminals of the "AND" gates 245 and 247 momentarily enable the flip-flop 260 to store the output state of the comparator 172.

The output of the flip-flop 260 is then applied through the output conductors 265 and 267 to the indicator 270 of conventional type to indicate a "GO" or "NO-GO" signal.

Thus, for example, upon the sensed condition at line 170 being greater than the reference signal applied by the threshold adjustment voltage device 175, a low electrical output signal will be applied through line 241 to the input terminal of the "AND" gate 245 by the comparator 172 and a high electrical output signal will be applied through conductor 242 to the input terminal of the "AND" gate 247 so that there may be effected at the indicator 270 a red "NO-GO" light or alarm indicating that the input information provided by the signal devices 100A and 100B disagreed by greater than the set threshold. Conversely, if the threshold value applied by the device 175 is greater, there would be effected at the indicator 270 a "GO" signal indicating that the sense input information provided by the signal devices 100A and 100B was within limits set by the threshold adjustment voltage device 175. In either case the sensed condition is effective at the instant the sampling pulse is applied through the differentiating capacitor 252 and the control lines 250 to the control input terminals of the "AND" gates 245 and 247 to render the flip-flop network 260 effective to operate the indicator 270 in the manner specified.

TWO-WIRE OUTPUT ALTERNATING CURRENT SIGNAL DEVICE—FIG. 3

Figure 3:
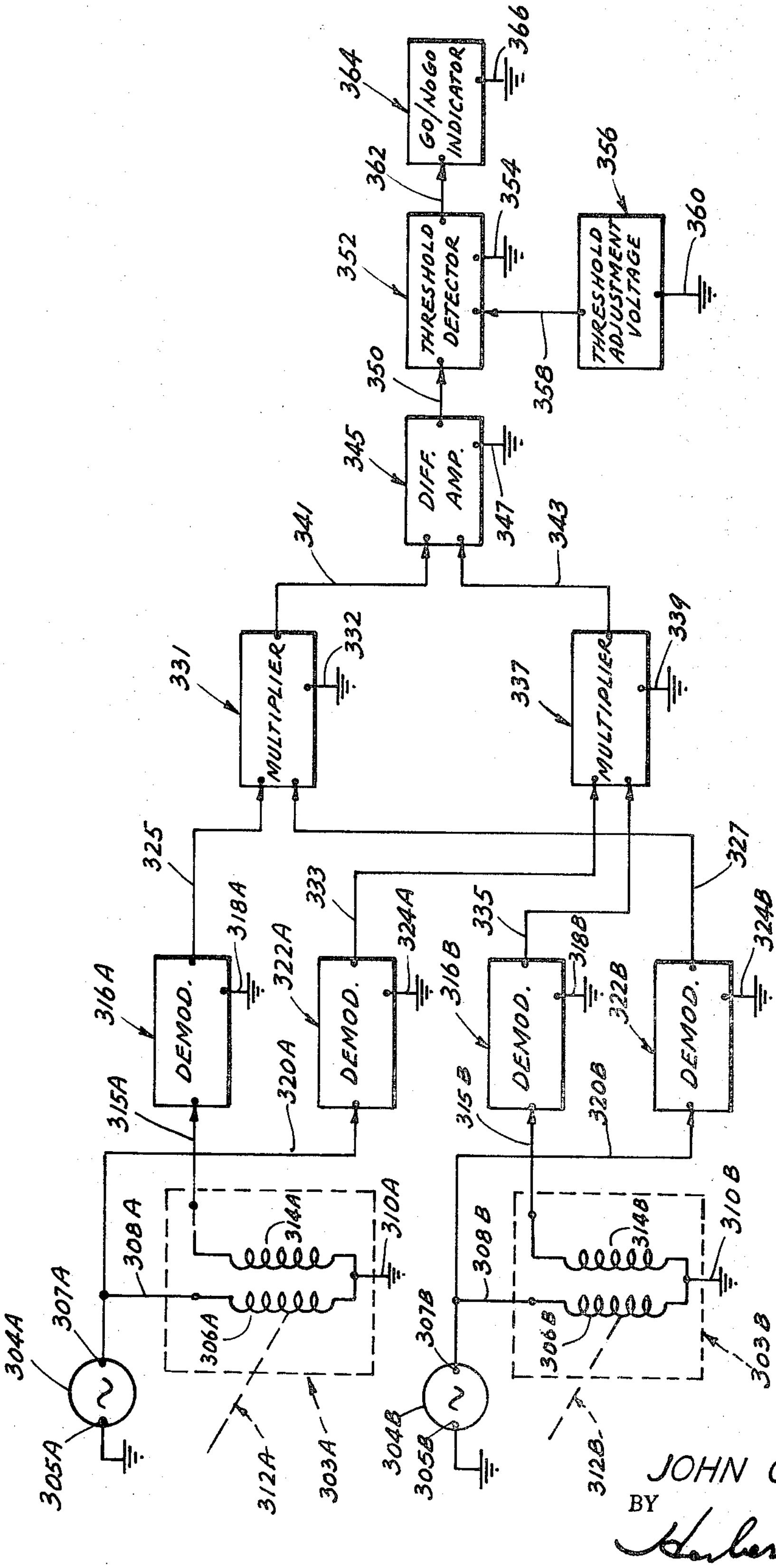
FIG. 3 is a schematic block diagram of a further modified form of the invention as applied to a comparator system to detect a difference in encoded information on a pair of alternating current signals supplied from electrical signal devices of a two wire output type.

In a further modified form of the comparator system shown by FIG. 3, the invention is illustrated as applied to a pair of alternating current signal devices 303A and 303B having a two-wire signal output.

The alternating current signal devices 303A and 303B may be of a conventional type, each having a rotor winding excited from a suitable source of alternating current.

The rotor winding 306A is excited from a source of alternating current 304A having a grounded output terminal 305A and another output terminal 307A connected through a conductor 308A to one end of the rotor winding 306A with the opposite end of the rotor winding 306A connected to a grounded conductor 310A.

The rotor winding 306A of the signal device 303A may be angularly positioned by suitable means such as a shaft 312A in inductive relation to stator winding 314A of the signal device 303A so as to apply coded information on the alternating current signals induced in the stator winding 314A of the signal device 303A. One end of the stator winding 314A is connected to the grounded conductor 310A while the opposite end of the stator winding 314A is connected through an output conductor 315A to an input of a demodulator 316A having a grounded input-output terminal 318A.

Further, an output conductor 320A leads from the output terminal 307A of the source of alternating current 304A to an input terminal of a second demodulator 322A having a grounded input-output conductor 324A.

In a like manner, there is provided a separate alternating current signal from a different alternating current signal device such as a synchro or resolver indicated generally by the numeral 303B and having a two-wire signal output. The signal device 303B is also of a conventional type having a rotor winding 306B excited by a different source of alternating current 304B. Further cooperating with the signal device 303B and the source of alternating current 304B are corresponding parts and elements to those heretofore described with reference to the signal device 103A and the other source of alternating current 304A, each such part being indicated by corresponding numerals bearing the suffix B.

The demodulators 316A and 316B are thus connected respectively to the outputs of the alternating current signal device 303A and 303B, while the demodulators 322A and 322B have inputs connected respectively to the outputs of the different sources of alternating current 304A and 304B, as shown by FIG. 3. Outputs from the demodulators 316A and 322B are connected by conductors 325 and 327, respectively, to separate inputs of a multiplier 331 having a grounded input-output connection 332. Similarly, outputs from the demodulators 322A and 316B are connected respectively by conductors 333 and 335 to separate inputs of a multiplier 337 also having a suitable grounded input-output connection 339.

An electrical output from the multiplier 331 proportional to the product of the electrical outputs from the demodulators 316A and 322B is connected by an output conductor 341 to an input of a difference amplifier 345 also having a suitable grounded input-output connection 347. Also, an electrical output from the multiplier 337 proportional to the product of the electrical outputs from the demodulators 322A and 316B is connected by an output conductor 343 to a separate input of the difference amplifier 345.

An electrical output from the difference amplifier 345 proportional to any difference between the product of the outputs of the demodulators 316A and 322B and the product of the outputs of the demodulators 322A and 316B is applied by an output conductor 350 to an input of a threshold detector 352 having a suitable grounded input-output connection 354.

The detector 352 may be referenced to a fixed threshold level by a suitable threshold adjustment voltage device 356 operatively connected thereto by an electrical conductor 358 and a grounded output connection 360. Alternatively, the threshold of the threshold detector 352 may be a function of the excitation voltages, such as the attenuated sum in a manner well known in the art.

An electrical output difference signal is applied through an output conductor 362 leading from an output of the threshold detector 352 to a suitable "GO or NO-GO" indicator or alarm device 364 of conventional type and having a grounded input connection 366.

TWO-WIRE OUTPUT DIRECT CURRENT SIGNAL DEVICE—FIG. 4

Figure 4:
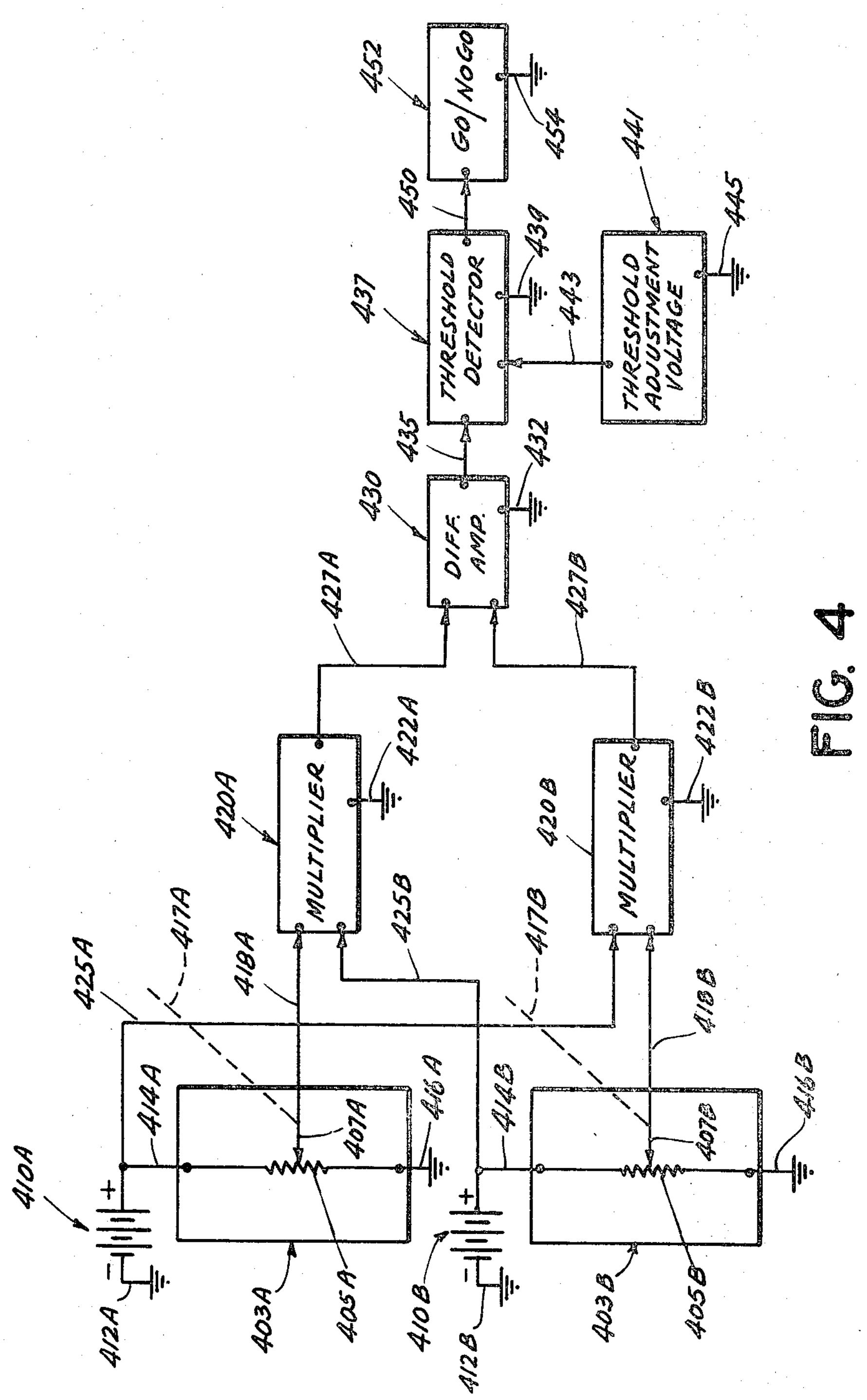
FIG. 4 is a schematic block diagram of the invention as applied to a pair of direct current output signal devices.

A further modified form of the invention is illustrated in FIG. 4 as applied to a pair of direct current signal devices 403A and 403B having a two-wire signal output.

The direct current signal devices 403A and 403B may be of a conventional potentiometer type each having a variable resistor element 405A and 405B, and angularly adjustable wiper arms 407A and 407B cooperatively arranged in relation to the resistor elements 405A and 405B, respectively, to vary the effective resistance thereof.

The resistor element 405A is excited from a source of direct current or battery 410A having a grounded negative terminal 412A and a positive terminal connected through a conductor 414A to one end of the resistor element 405A, while the opposite end of the resistor element 405A is connected to ground through a conductor 416A.

The wiper arm 407A of the signal device 403A may be angularly positioned by suitable means such as a shaft 417A so as to vary a voltage output signal applied through an output conductor 418A and thereby coded information applied thereto. The output conductor 418A is connected to one input terminal of a multiplier 420A having a grounded input-output terminal 422A.

In a like manner, there is provided the separate direct current signal device 403B including the variable resistor element 405B excited by a separate source of direct current or battery 410B having a grounded negative terminal 412B and a positive terminal connected through a conductor 414B to one end of the resistor element 405B, while the opposite end of the resistor element 405B is connected to ground through a conductor 416B.

The wiper arm 407B of the signal device 403B may be angularly positioned by suitable means such as a shaft 417B so as to vary a voltage output signal applied through an output conductor 418B and thereby coded information applied thereto. The output conductor 418B is connected to one input terminal of a multiplier 420B having a grounded input-output terminal 422B.

Further, an output conductor 425A leads from the positive terminal of the battery 410A to another input terminal of the multiplier 420B, while an output conductor 425B leads from the positive terminal of the separate source of direct current or battery 410B to another input terminal of the multiplier 420A.

An electrical output from the multiplier 420A proportional to the product of the electrical outputs from the direct current signal device 403A and the battery 410B is connected by an output conductor 427A to an input terminal of a difference amplifier 430 also having a suitable grounded input-output connection 432.

Also, an electrical output from the multiplier 420B proportional to the product of the electrical outputs from the direct current signal device 403B and the battery 410A is connected by an output conductor 427B to another input terminal of the difference amplifier 430.

An electrical output from the difference amplifier 430 proportional to any difference between the product of the signals applied through input conductor 427A and the product of the signals applied through input conductor 427B is applied by an output conductor 435 to an input of a threshold detector 437 having a suitable grounded input-output connection 439.

The detector 437 may be referenced to a fixed threshold level by a suitable threshold adjustment voltage device 441 operatively connected by an electrical conductor 443 and a grounded output connection 445. Alternatively, the threshold of the threshold detector 437 may be of a function of the excitation voltages, such as the attenuated sum in a manner well known in the art.

An electrical output difference signal is applied through an output conductor 450 leading from an output of the threshold detector 437 to a suitable "GO" or "NO/GO" indicator or alarm device 452 of conventional type and having a grounded input connection 454.

THEORY OF THE OPERATION OF THE INVENTION

The theory of operation of the several forms of the invention shown by FIGS. 1, 2, 3 and 4 is based upon the use of the following relationship between signal amplitudes:

(1) $$\frac{V_{x1}}{V_{x2}}=\frac{V_{y1}}{V_{y2}}$$

when the encoded angles are equal.

Where $V_x=V_E \sin(\theta+\phi)$
$V_y=V_E \sin(\theta+\psi)$
$\theta$=input (encoded) angle
$\phi$ and $\psi$=fixed offset angles determined by the source devices and reference angles
$V_E$=excitation voltage and numerical subscripts represent the first or second signal source.

The error signal may be derived as follows: The source generates a signal whose amplitude is of the form (2) $$V_x=kV_E \sin(\theta+\phi)$$ $$V_y=kV_E \sin(\theta+\psi)$$

where
$\theta$=input (encoded) angle and
$\phi$ and $\psi$=fixed offset angles determined by the source devices and reference phase.

For typical resolver inputs $$\phi=0^\circ$$
$$\psi=90^\circ$$

For typical synchro inputs $$\phi=120^\circ$$
$$\psi=-120^\circ$$

$V_E$=excitation voltage
$k$=voltage gain of source device.

The numeral subscripts in the following indicate the source. The encoded angles are equal when:

(3) $$\frac{V_{x1}}{V_{x2}}=\frac{V_{y1}}{V_{y2}} \text{ or } V_{x1}V_{y2}=V_{x2}V_{y1}$$

An error signal $\Delta$ may be developed such that (4) $$\Delta=V_{x1}\cdot V_{y2}-V_{x2}\cdot V_{y1}$$

where $\Delta=0$ when $\theta_1=\theta_2$

Using the expression above for $V_x$ and $V_y$:

(5) $$\Delta = k_1V_{E1}\sin(\theta_1+\phi_1)\cdot k_2V_{E2}\sin(\theta+\psi_2) - k_2V_{E2}\sin(\theta_2+\phi_2)\cdot k_1V_{E1}\sin(\theta_1+\psi_1)$$

$$\frac{\Delta}{k_1k_2V_{E1}V_{E2}} = \sin(\theta_1+\phi_1)\sin(\theta_2+\psi_2) - \sin(\theta_2+\phi_2)\sin(\theta_1+\psi_1)$$

Expanding:

(6)

$$\frac{\Delta}{k_1k_2V_{E1}V_{E2}} = (\sin\theta_1\cos\phi_1 + \cos\theta_1\sin\phi_1)(\sin\theta_2\cos\psi_2 + \cos\theta_2\sin\psi_2) - (\sin\theta_2\cos\phi_2 + \cos\theta_2\sin\phi_2)(\sin\theta_1\cos\psi_1 + \cos\theta_1\sin\psi_1)$$

Since both sources are of the same type.

$$\psi_1=\psi_2 \text{ and } \phi_1=\phi_2$$

The following substitutions may be made:

$$A=\sin\psi_1=\sin\psi_2$$
$$B=\cos\psi_1=\cos\psi_2$$
$$C=\sin\phi_1=\sin\phi_2$$
$$D=\cos\phi_1=\cos\phi_2$$

Using these substitutions in the above equation, by cross multiplying, it reduces to:

(7)

$$\frac{\Delta}{k_1k_2V_{E1}V_{E2}} = (AD-BC)(\sin\theta_1\cos\theta_2 - \cos\theta_1\sin\theta_2)$$

Which is the same as:

(8) $$\frac{\Delta}{k_1k_2V_{E1}V_{E2}} = (AD-BC)\sin(\theta_1-\theta_2)$$

or $$\Delta = k_1k_2V_{E1}V_{E2}\sin(\theta_1-\theta_2)$$

where $k$=a constant value depending upon the type of source device.

$k=(AD-BC)$
$=\sin\psi\cos\phi-\cos\psi\sin\phi=\sin(\psi-\theta)$
$k=1$ for a typical resolver system and
$k=0.866$ for the typical synchro system The above shows that the error signal $\Delta$ goes to zero when the encoded angles are equal. For small error signal is approximately proportional to the difference in the input quantities. For all differences, $\Delta$ is proportional to the sine of the difference. Also, the sign of the differences is detected. Further, the error signal includes a gain factor proportional to the type of source devices (resolver, synchro, etc.) and their gains, all of which are essentially constant in a given system, and the two excitation voltages. If the variations of the excitation are large, they must either be cancelled out or allowed for in the thershold of the output.

In the operation, such as shown by FIG. 3, of a two-wire system, the signals presented to the demodulator 316A and 316B are as follows:

for 316A $$V_{x1}=N_1\cdot V_{E1}$$

and for 316B $$V_{x2}=N_2\cdot V_{E2}$$

where $N_1$ and $N_2$ are the quantities being transmitted.

Applying the excitation voltages to the demodulators 322A and 322B for 322A $$V_{y1}=V_{E2}$$

and for 322B $$V_{y2}=V_{E2}$$

Then:

(9)

$$\Delta = V_{x1}\cdot V_{y2} - V_{x2}\cdot V_{y1}$$
$$= N_1V_{E1}\cdot V_{E2} - N_2V_{E2}\cdot V_{E1}$$
$$= V_{E1}\cdot V_{E2}(N_1-N_2)$$

The output is proportional to the differences between the transmitted parameters and to the excitation voltages. This output will always be zero for zero differences in the transmitted parameters.

In the block diagram of FIG. 3, the demodulators 316A, 316B, 322A and 322B remove the A.C. carrier leaving the signal as a basic D.C. level. (D.C. signals from sources such as potentiometers would obviate the requirement for demodulation). The multiplier 331 performs the function $V_{x1}\cdot V_{y2}$ and the multiplier 337 performs $V_{x2}\cdot V_{y1}$. The difference amplifier 345 finds the difference ($\Delta$) between the two multiplier outputs and the detector 352 determines the relationship of the difference to zero.

OPERATION OF FIGURE 2

Referring now to FIG. 2 in explaining the operation of the three-wire alternating current signal comparator, it will be seen that the effect of the circuit is the same as used for the two-wire where the $V_y$ inputs were the excitation voltages. The four signals (two from each signal source 100A and 100B) are demodulated in demodulators 106A, 110A, 106B and 110B, one signal $V_{x2}$ being inverted at the input conductor 104B leading from the signal source 100B to one of the inputs of the demodulator 106B. Inasmuch as the demodulators 106A, 110A, 106B and 110B are synchronous sampling detectors, peak point detectors 122A and 122B are required as a source of sampling pulses.

The demodulators remove the carrier frequency/phase information from the signals. The ramp generator 140 generates a single ramp voltage, each cycle of $V_{E1}$ being synchronized by the peak point detector 122A. By a comparison of the ramp amplitude, which sweeps from the most negative to the most positive signal amplitude, with the signals from the demodulators 106A and 110A, two constant amplitude pulses are generated.

The output of comparator 132A is of a duration proportional to the input $V_{x1}$ and the output of the comparator 132B is of a duration proportional to the input $V_{y1}$. These pulses are used to gate the outputs of the demodulators 106B and 110B through transmission gates 150 and 152, respectively. The pulse from the gate 150 is of a width proportional to $V_{y1}$ and the amplitude proportional to $-V_{x2}$. In other words, its area is proportional to $(V_{y1})\cdot(-V_{x2})$. Similarly, the output of gate 152 has an area proportional to $(V_{y2})\cdot(V_{x1})$. The integrator 156 produces a voltage output proportional to the sum of these areas, that is $V_{x1}\cdot V_{y2}-V_{x2}V_{y1}$, which is the error signal. The integrator 156 is discharged and clamped to zero by the output of the logic gate 164 except when a pulse is being emitted by the comparator 132A and/or comparator 132B in order to establish the proper initial condition. The comparator 172 detects a GO condition.

$$(V \text{ threshold} > \Delta > -V \text{ threshold})$$

or a NO-GO condition $$(\Delta > V \text{ threshold or } \Delta < -V \text{ threshold})$$

A sthe output is valid only when both pulses have been integrated, the leading edge of the pulse from the gate 164 can be used to sample the comparator output for the storage of the GO/NO-GO condition in the flip-flop network 260 for operation of the indicator 270. Adjustment of the voltage from the threshold device 175 may be fixed or may be a function of the excitation voltages, for example $(V_{E1}+V_{E2})$, for compensation. Similarly the input voltage to the ramp generator 140 may be varied by adjustment of the threshold adjustment voltage device 208.

The transmission gate or reset generator 180 is necessary in order that the charge accumulated in the integrating capacitor 220 will be reduced to zero at the start of each measurement. This is accomplished by using the logic gate 164 to release the reset "high" signal applied to conductor 179 whenever either comparator 132A or comparator 132B is producing a "high" output indicative that the output of the demodulator 106A or 110A exceeds the output of the ramp generator 140.

The differentiating capacitor 252 (or similar standard differentiating device) detects the instant when the reset "high" signal applied to the conductor 179 is turned on. This sampling signal, in turn applied by the differentiating capacitor 252 to the "AND" gate control conductors 250, gates the result of the measurement appearing on the output conductors 241 and 242 from the comparator 172 into the flip-flop network 260 or other storage device to operate the indicator 270.

Analog difference outputs rather than, or in addition to, the GO/NO-GO output may be provided by gating the signal output from the integrator 156 into an analog hold circuit utilizing the leading edge of the pulse from the gate 164. The embodiment illustrated by FIG. 2 produces output updating of the indicator 270 at the frequency of excitation of the signal source 100A.

While several embodiments of the invention have been illustrated and described, various changes in the form and relative arrangement of the parts, which will now appear to those skilled in the art, may be made without departing from the scope of the invention. Reference is, therefore, to be had to the appended claims for a definition of the limits of the invention.

What is claimed is:

1. A comparator for detecting the relationship of signals from two separate and independent sources, each source providing X and Y signal amplitude components; comprising first means for multiplying the X signal component amplitude of one source by the Y signal component amplitude of the other source to provide a first output product signal, second means for multiplying the Y signal component amplitude of the one source by the X signal component amplitude of the other source to provide a second output product signal, comparator means, means operably connecting said first and second output product signals to said comparator means to produce a signal responsive to a relationship of said signals, each of said sources providing alternating current signals having X and Y signal amplitude components, at least one of said signal components being a function of encoded information, means to demodulate said alternating current signal components before being multiplied by said first and second means, the comparator means including means for integrating said first and second output product signals so as to provide an algebraic difference between the first and second output product signals as the comparator output signal, means for resetting the integrating means, said resetting means including means responsive to the X and Y amplitude components of the other source to effect a resetting signal upon both the X and Y signal amplitude components of said other source decreasing below a threshold value, indicator means, and switching means responsive to the resetting signal to selectively connect the comparator output signal to operate the indicator means at a frequency dependent upon the frequency of a recurrence in the decrease in both the X and Y signal amplitude components of said other source below said threshold value.

2. The combination defined by claim 1 including a differentiating capacitor for coupling the resetting signal at the initiation thereof to the switching means to selectively connect the comparator output signal to operate said indicator means.

3. The combination defined by claim 1 in which the switching means includes a flip-flop network to store the comparator output signal to operate said indicator means, and a differentiating capacitor for coupling the resetting signal at the initiation thereof to the switching means to selectively connect the comparator output signal to said flip-flop network to operate the indicator means.

4. Apparatus for detecting a difference between signals from two separate sources, each source providing a signal having X and Y signal components, and at least one of said signal components being a function of encoded information; said apparatus comprising an integrator means, first control means, one means responsive to a condition of the X signal component of a signal from one of said sources to operate said first control means so as to selectively apply to said integrator means the Y signal component of a signal from said other source so as to control a condition of the Y signal component of the signal from said other source, second control means, other means responsive to a condition of the Y signal component of the signal from said one source to operate said second control means so as to selectively apply to said integrator means the X signal component of a signal from said other source so as to control a condition of the X signal component of the signal from said other source, the integrator means selectively integrating said controlled X and Y signal components of the signal from said other source, and means for comparing said integrated signal components to provide a signal indicative of the difference between the signals from said two sources.

5. The combination defined by claim 4 including a demodulator for each of the X and Y signal components from each of said signal sources.

6. Apparatus for detecting a difference between signals from two separate sources, each source providing a signal having X and Y signal components, and at least one of said signal components being a function of encoded information; said apparatus comprising first means responsive to a condition of the X signal component of a signal from one of said sources to control a condition of the Y signal component of a signal from said other source, second means responsive to a condition of the Y signal component of the signal from said one source to control a condition of the X signal component of the signal from said other source, integrator means for integrating said controlled X and Y signal components of the signal from said other source, and means for comparing said integrated signal components to provide a signal indicative of the difference between the signals from said two sources; means for sampling the signal components from each of said sources, means for applying separate excitation timing signals to said sampling means for synchronizing the application of the X and Y signal components from each of said sources by operation of the sampling means by said separate excitation signals.

7. The combination defined by claim 6 in which the operation of said first and second control means are synchronized by means operably connected to the means for applying said timing signals for synchronizing the application of the X and Y signal components from said one source.

8. Apparatus for detecting a difference between signals from two separate sources, each source providing a signal having X and Y signal components, and at least one of said signal components being a function of encoded information; said apparatus comprising first means responsive to a condition of the X signal component of a signal from one of said sources to control a condition of the Y signal component of a signal from said other source, second means responsive to a condition of the Y signal component of the signal from said one source to control a condition of the X signal component of the signal from said other source, integrator means for integrating said controlled X and Y signal components of the signal from said other source, means for comparing said integrated signal components to provide a signal indicative of the difference between the signals from said two sources, and means for periodically applying a signal for resetting said integrator means in response to a controlling action of both said first and second control means in one sense.

9. The combiation defined by claim 8 including means for storing the signal indicative of the difference between the signals from said two sources, differentiating means to detect the signal for resetting said integrator means, and said differentiating means rendering said storing means effective at the instant of detection of the resetting signal.

10. Apparatus for detecting a difference between signals from two separate sources, each source providing a signal having X and Y signal components, and at least one of said signal components being a function of ecoded information; said apparatus comprising first means responsive to a condition of the X signal component of a signal from one of said sources to control a condition of the Y signal component of a signal from said other source, second means responsive to a condition of the Y signal component of the signal from said one source to control a condition of the X signal component of the signal from said other source, integrator means for integrating said controlled X and Y signal components of the signal from said other source, means for comparing said integrated signal components to provide a signal indicative of the difference between the signals from said two sources, a demodulator for the X and Y signal components of both of said sources, means for synchronizing the X and Y signal components of said one source by an excitation signal, other means for synchronizing the X and Y signal components of said other source by a separate excitation signal, said first and second controlling means being synchronized by the means for synchronizing the X and Y quadrature compoents of said one source, means for providing a signal for resetting said integrator means in response to a controlling action of both said first and second control means in one sense, means for storing the signal indicative of the difference between the signals from said two sources, differentiating means responsive to the resetting signal for rendering the storing means effective, and indicator means operable by the signal stored by said storing means for indicating the difference between the signals from said two sources.

11. The combination defined by claim 10 in which the resetting means includes a logic gate operable by said first and second means to provide a signal for resetting said integrator means in response to a controlling action of both said first and second control means in said one sense, said storing means includes a flip-flop network, control gate means selectively operable to render the flip-flop network effective for storing the signal indicative of the difference between the signals from said two sources, and the differentiating means includes a capacitor for coupling the resetting signal provided by said logic gate to the selectively operable control means for rendering the storing means effective to receive and store the signal indicative of the difference between the signals from said two sources at the instant the logic gate provides the resetting signal.

12. A method to detect a difference between information encoded on electrical signals from two separate and independent sources, each of said sources providing X and Y electrical signal amplitude components, at least one of said signal components being a function of encoded inforamtion; said method comprising the steps of multiplying the X electrical signal amplitude component of one of said two sources by the Y electrical signal amplitude component of another of said two sources, multiplying the Y electrical signal amplitude component of said one source by the X electrical signal amplitude component of the other of said two sources, comparing electrical products obtained by said multiplying steps to detect a difference between information encoded on the electrical signals from said two separate and independent sources, and resetting the comparison of the electrical products obtained by said multiplying steps upon both the X and Y electrical signal amplitude components of one of said sources decreasing below a predetermined threshold value.

13. The method defined by claim 12 including the steps of periodically storing an electrical difference between the electrical products obtained by said multiplying steps in synchronism with initiation of the step of resetting the comparison of the electrical products obtained by said multiplying steps, and indicating the stored electrical difference.

14. A method to detect a difference between information encoded on electrical signals from two separate and independent sources of polyphase alternating current signals, each of said sources providing X and Y electrical signal amplitude components, at least one of said signal components being a sine function of encoded information; said method comprising the steps of demodulating the X and Y electrical components of each of said sources, multiplying the demodulated X electrical signal amplitude component of the one source by the demodulated Y electrical signal amplitude component of the other source to provide a first electrical product signal, multiplying the demodulated Y electrical signal amplitude component of the one source by the demodulated X electrical signal amplitude component of the other source to provide a second electrical product signal, integrating the first and second electrical product signals to obtain an electrical difference signal of a sense dependent upon the electrical difference between the first and second electrical product signals, measuring the electrical difference signal to detect a difference between the information encoded on the electrical signals from the two separate and independent sources of polyphase alternating current signals, resetting the step of integrating the first and second electrical product signals upon both the X and Y electrical signal amplitude components of one of said sources decreasing below a first predetermined threshold value, periodically storing the measured electrical difference signal upon the measured difference signal exceeding a second predetermined value, effecting the storing step simultaneously with initiating the resetting of the step of integrating the first and second product signals, and indicating the sense of the stored electrical difference signal in effectively detecting the difference between the information encoded on the electrical signals from the two separate and independent sources of polyphase alternating current signals.

References Cited

UNITED STATES PATENTS

| | | | |
|---|---|---|---|
| 3,253,223 | 5/1966 | Kettel | 328—133 X |
| 3,368,036 | 2/1968 | Carter | 178—88 X |
| 3,369,185 | 2/1968 | Carter | 328—133 X |
| 3,390,343 | 6/1968 | Carter | 329—112 X |
| 3,401,344 | 9/1968 | Andrus et al. | 307—246 X |

DONALD D. FORRER, Primary Examiner

R. C. WOODBRIDGE, Assistant Examiner

U.S. Cl. X.R.

307—243; 328—133, 166; 329—112